Nov. 13, 1951 V. MOORE 2,575,229
GAS TURBINE CONTROL SYSTEM
Filed Sept. 28, 1946 2 SHEETS—SHEET 2
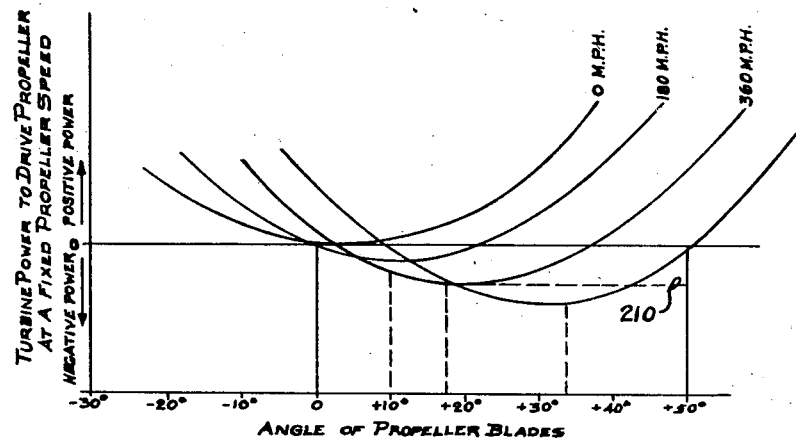
Fig. 2
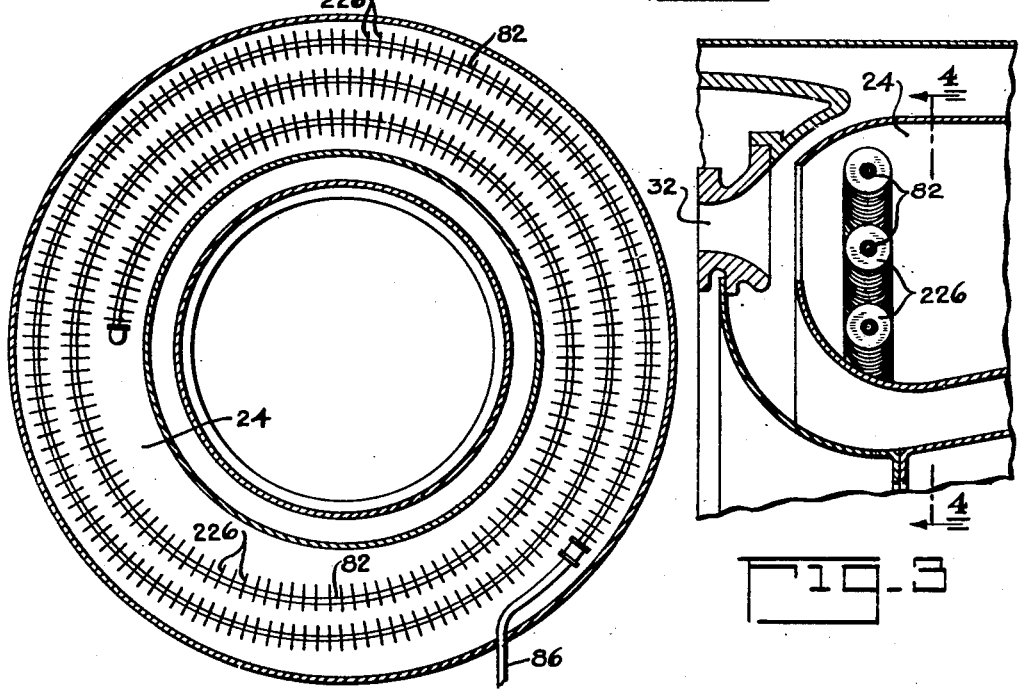
Fig. 3
Fig. 4
INVENTOR
VINCENT MOORE.
BY
ATTORNEY Patented Nov. 13, 1951

2,575,229

UNITED STATES PATENT OFFICE 2,575,229

GAS TURBINE CONTROL SYSTEM

Vincent Moore, Ridgewood, N. J., assignor to Wright Aeronautical Corporation, a corporation Application September 28, 1946, Serial No. 700,029

20 Claims. (Cl. 170—135.72)

This invention relates to control systems for gas turbines and is particularly directed to a control system for a gas turbine drivably connected to an adjustable pitch propeller.

The conventional reciprocating type aircraft engine and adjustable pitch propeller combination generally is provided with two regulating devices for controlling the engine power output—namely, a speed governor and an engine intake pressure regulator. In this combination, the governor controls the engine speed by regulating the pitch or blade angle of the propeller to maintain the engine speed at the value for which the governor is set while the air intake pressure regulator maintains this pressure and therefore the engine torque at a predetermined value—for example, by controlling the engine air throttle valve which in turn effects control of the engine fuel supply. In a gas turbine propeller combination, control of the turbine power is more difficult, particularly because of the relation between the power characteristics of gas turbines and aircraft propellers. Thus, the conventional type of gas turbine, when operating at a constant combustion chamber temperature, will have a curve of turbine horsepower v. turbine speed differing only slightly in curvature and slope from that of the power absorbed v. propeller speed curve of a conventional propeller operating at a particular blade angle. Accordingly, stable control of the speed of a gas turbine, by controlling the propeller blade angle, is difficult compared to the corresponding speed control of a conventional reciprocating type engine.

It is an object of this invention to provide a stable gas turbine power control system in which means other than the pitch or blade angle of the propeller is used to control the speed of the turbine. Specifically, the invention comprises means for varying the turbine fuel supply in response to variations in turbine speed together with means for varying the pitch or blade angle of the propeller in response to variations in turbine temperature.

Other objects of this invention will become apparent upon reading the annexed detailed description in connection with the drawing in which:

Figure 2 is a graph illustrating certain propeller characteristics;

Figure 3 is an enlarged view of a portion of a turbine combustion chamber; and

Figure 4 is a view taken on line 4—4 of Figure 3.

Figure 1:
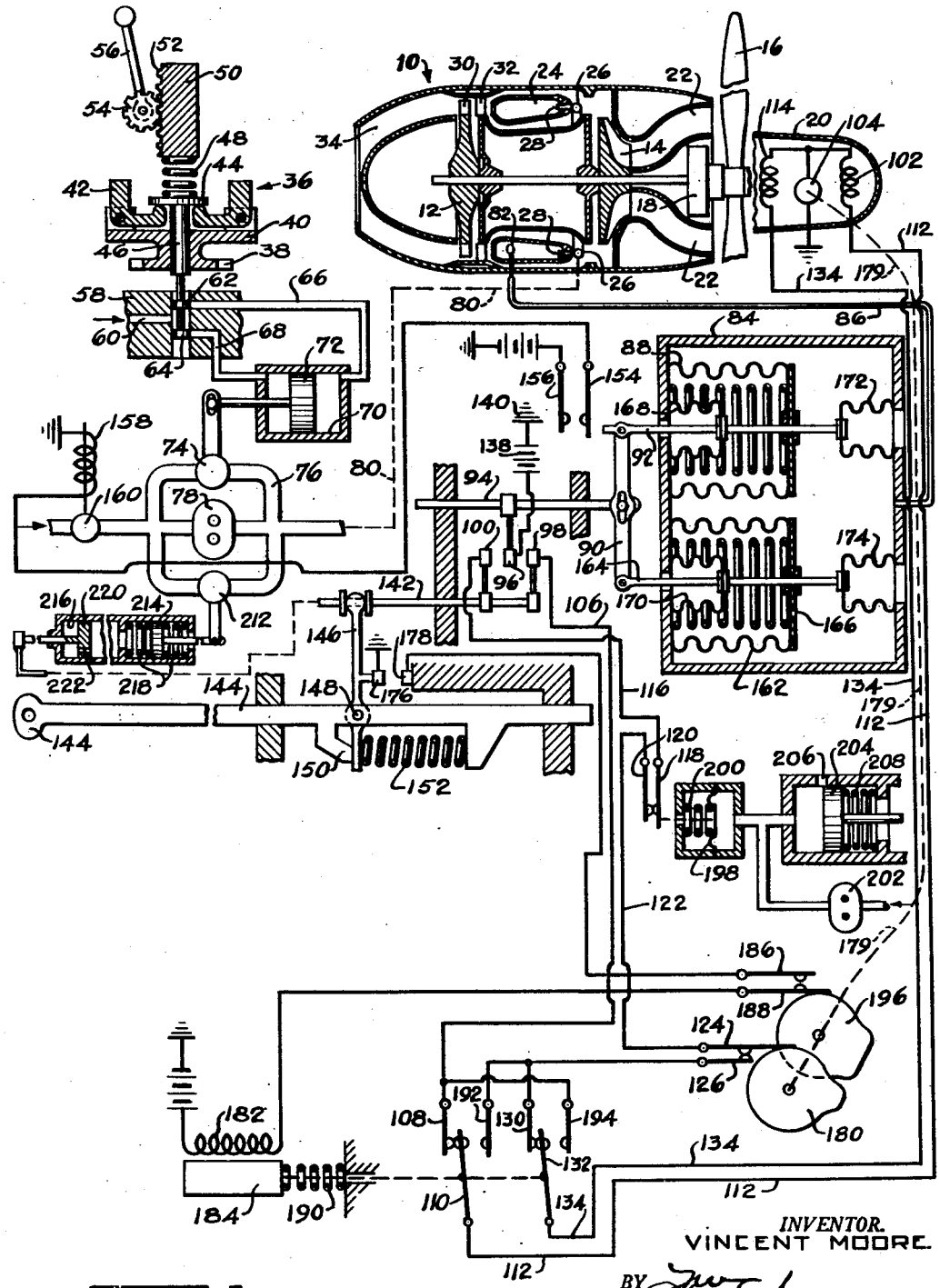
Figure 1 is a diagrammatic view of a gas turbine propeller combination and a power control system therefor embodying the invention.

Referring to the drawing, a gas turbine power plant 10 for aircraft is schematically illustrated as comprising a turbine rotor 12 drivably connected to a compressor 14 and to an adjustable pitch propeller 16 through a reduction gear unit 18. The nose 20 of the propeller is provided with conventional mechanism for adjusting the pitch or blade angle of the propeller. Air enters the compressor 14 through a forwardly directed intake duct 22 and is discharged by the compressor to a combustion chamber 24. Fuel is supplied to the combustion chamber from a fuel manifold 26 and nozzles 28. From the combustion chamber 24, the combustion gases are directed into the turbine rotor blades 30 by a nozzle 32. Upon leaving the turbine rotor blades, the exhaust gases are discharged rearwardly through the exhaust duct 34.

The power control for the gas turbine comprises a governor 36 adapted to regulate the rate of fuel supply to the turbine. As illustrated, the governor comprises a gear 38 arranged to be driven from the turbine by means not shown. An annular plate 40 is connected to the gear 38 and a pair of flyweights 42 are pivotally mounted on this plate for rotation therewith. The inner ends of the flyweights engage a flange 44 formed on one end of a rod 46 extending through the plate 40 and the gear 38. A spring 48 acting on the flange 44 restrains movement of the rod 46 by the flyweights 42. The spring 48 also acts against an abutment 50 having rack teeth 52. A pinion gear 54 is engageable with the rack teeth 52 and a control handle 56 is arranged to rotate the pinion 54 for changing the compression of the spring 48.

The governor rod 46 projects into a valve housing 58 to which a suitable fluid under pressure is supplied through a passage 60. The rod 46 is provided with a pair of spaced lands 62 and 64 adapted to be so disposed that fluid under pressure is admitted to the annular space therebetween from the passage 60. In the position of the governor illustrated, the lands 62 and 64 shut off the fluid pressure supplied thereto from a pair of outlet passages 66 and 68. The construction is such that, upon an increase in the speed of the turbine, the flyweights 42 move the valve rod 46 against the spring 48 to admit fluid pressure from passage 60 to passage 66 and, upon a decrease in the speed of the turbine, the spring 48 moves the rod 46 to admit fluid pressure from the passage 60 to the passage 68.

The passages 66 and 68 are connected to opposite ends of a cylinder 70 for moving a piston 72 operatively connected to a valve 74. The valve 74 controls a by-pass passage 76 around a positive displacement fuel pump 78, this pump being drivably connected to the turbine by means not shown. The fuel pump 78 is arranged to supply fuel to the fuel manifold 26 via a passage 80.

With this governor construction, the turbine speed stabilizes with the valve rod 46 closing both passages 66 and 68 as illustrated. In this way, each setting of the control handle 56 corresponds to a particular turbine speed. Any change in the turbine speed from this value results in adjustment of the fuel by-pass valve 74 by the governor to regulate the fuel supply to the turbine to maintain the turbine speed at the value for which the governor is set.

As described, the pump 78 is a positive displacement type pump and therefore the pump automatically increases or decreases the rate of fuel supply to the turbine with increase or decrease respectively of the turbine speed. Instead of controlling the by-pass valve around a positive displacement pump, the governor 36 may be arranged to control the capacity of such a pump. Obviously, the invention is not limited to the use of a positive displacement fuel pump so that the fuel control valve may comprise a valve in the turbine fuel supply line instead of in a by-pass passage as illustrated.

As used in the following description, the blade angle of the propeller blades is considered zero when the blade chord, at some arbitrary distance from the axis of rotation of the propeller, is in the plane of rotation of said propeller. This angle corresponds approximately to the blade position for minimum propeller power at zero aircraft air speed. The blade angle of the propeller blades is considered positive when the blades are adjusted from said zero angle in a direction for forward aircraft thrust and when the propeller blades are adjusted in the opposite direction from said zero angle, the aircraft is provided with reverse thrust and the blade angle is considered negative. Unless otherwise specified, the following description of the control of the propeller blades is limited to propeller operation for forward aircraft thrust—that is to the control of the positive propeller blade angle.

The turbine power control system also includes means for varying the blade angle of the propeller blades in response to changes in the temperature of the turbine, thereby controlling the torque output of the turbine.

As illustrated, the turbine temperature is measured by a suitable gas bulb or thermal element 82 communicating with a housing 84 through a passage 86. The thermal element 82 may have the form illustrated in Figures 3 to 4. A flexible bellows 88 is disposed within the housing such that the bellows expands and contracts with decrease and increase respectively of turbine combustion chamber temperature. The bellows 88 is connected to a lever 90 by a rod 92 and a second rod 94 is movable thereby. A contact 96, carried by the rod 94, is disposed between a pair of contacts 98 and 100.

The contact 98 is connected to a winding 102 of a propeller pitch or blade angle changing motor 104, said motor operating to increase the propeller blade angle when the winding 102 is energized thereby increasing the torque required to rotate the propeller at a particular speed. This connection includes a wire 106, normally closed switch contacts 108 and 110 and a wire 112. The contact 100 is connected to a winding 114 of the motor 104 and when this winding is energized, the motor 104 operates to decrease the pitch or blade angle of the propeller blades. This latter connection includes a wire 116, normally closed switch contacts 118 and 120, a wire 122, normally closed switch contacts 124 and 126, normally closed switch contacts 130 and 132 and a wire 134— all serially connected as illustrated. One side of the motor 104 is connected to both of its windings 102 and 114 while the other side of the motor is grounded at 136. The intermediate or temperature-responsive contact 96 is connected to a suitable source of electric energy 138 grounded at 140.

When the turbine temperature is at the desired value, the temperature responsive contact 96 is disposed between and out of engagement with contacts 98 and 100. An increase in turbine temperature results in contraction of the bellows 88 and, if this temperature increase is sufficient, the contact 96 is moved to the left to engage the contact 100 and complete a circuit to the propeller pitch decreasing winding 114. Thereupon, the motor 104 operates to decrease the angle of the propeller blades thereby decreasing the power absorbed by the propeller at a given propeller speed. In the absence of any turbine speed control (such as provided by the previously described governor 36), a decrease of the propeller blade angle would result in an increase in the speed of the turbine. However, the governor 36 will operate to decrease the turbine fuel supply in order to maintain the turbine speed at its pre-set value. This operation of the governor 36 and pitch changing motor 104 continues until the drop in turbine temperature resulting from the decrease in rate of fuel supply thereto, as effected by the governor, is sufficient to again move the temperature responsive contact 96 between and out from engagement with contacts 98 and 100. Similarly, a decrease in turbine temperature from the desired value and of a magnitude sufficient to move the temperature responsive contact 96 to the right into engagement with contact 98 completes a circuit to the pitch increasing winding 102 of the motor 104 thereby increasing the blade angle of the propeller. An increase of the propeller blade angle tends to decrease the turbine speed so that the governor 36 now operates to increase the rate of turbine fuel supply to maintain the speed for which the governor is set and this operation of the governor 36 and pitch changing motor 104 continues until the turbine temperature again returns to its desired value.

In order to set the operating temperature of the turbine, the contacts 98 and 100 are carried by a movable rod 142. Movement of the rod 142 and its contacts 98 and 100 to the left increases the turbine temperature necessary to move the contact 96 intermediate and out from engagement with contacts 98 and 100. Similarly, movement of the rod 142 and its contacts 98 and 100 to the right reduces turbine temperature for which the control is set. Movement of the rod 142 is effected from a control arm 144 operatively connected to the rod 142 by a link 146. The link 146 is pivotally connected to the control arm 144 at 148 and is normally held against an abutment 150 on the control arm 144 by a spring 152. The link 146 is provided with a push-pull connection with the rod 142 between a pair of spaced flanges on the rod. With this arrangement, the rod 142 is movable by the control arm 144.

With the aforedescribed gas turbine power control, the primary control is that of the turbine fuel supply in response to changes in turbine speed. Thus, upon a change in turbine efficiency—for example, as a result of a change in aircraft speed—the governor 36 adjusts the turbine fuel supply to maintain the turbine speed at the value for which the governor is set. There is no adjustment of the blade angle of the propeller unless, for example, the adjustment of the turbine fuel supply results in a turbine temperature change sufficient to bring the temperature-responsive contact 96 into engagement with contact 98 or 100. Accordingly, within a temperature range determined by the spacing of contacts 98 and 100, the control acts as if the turbine were drivably connected to a fixed pitch propeller. When the turbine temperature departs from the desired value (as determined by the position of the rod 142) to an extent sufficient to bring the temperature-responsive contact 96 into engagement with contact 98 or 100, the blade angle of the propeller is adjusted so that the propeller absorbs more or less power as required in order to bring the turbine temperature back to the desired value. Movement of the control arm 144 shifts the temperature range, within which the turbine temperature is maintained, in a temperature increasing or decreasing direction depending on whether the arm 144 is moved to the left or right respectively.

With the contacts 98 and 100 spaced as illustrated, a turbine temperature range is provided within which the intermediate contact 96 engages neither of the contacts 98 and 100 and, therefore, within this turbine temperature range there is no adjustment of the blade angle of the propeller while the governor 36 controls the turbine fuel supply to maintain the turbine speed at the value for which the governor is set. With this arrangement, if the aircraft goes into a climb, the turbine will tend to slow down so that the governor will operate to increase the turbine fuel supply to maintain the turbine speed. As a result of the increase in the turbine fuel supply, the turbine temperature increases toward the upper limit of the temperature range determined by the setting of the contacts 98 and 100. Accordingly, when the aircraft climbs, the control automatically increases the turbine operating temperature toward the upper limit of the temperature range setting to an extent dependent on the steepness of the climb. Similarly, when the aircraft is put into a dive, the control automatically decreases the turbine operating temperature toward the lower limit of the temperature range setting.

In order to insure that the maximum allowable turbine temperature is never exceeded, means are provided to decrease the rate of fuel supply to the turbine upon excessive turbine temperature. Thus, when the turbine temperature exceeds a predeterminued value, the bellows rod 92 is effective to close switch contacts 154 and 156 thereby completing a circuit to a solenoid winding 158. This winding, when energized, is effective to close a valve 160 in the turbine fuel supply line.

The temperature responsive gas pressure within the housing 84 may also operate on a second bellows 162. This second bellows is operatively connected to the lever 90 by a rod 164 pivotally connected to the lever 90 at the end of lever 90 remote from its pivotal connection to the rod 92. The bellows 162 has a restricted opening 166 which is adapted to slowly equalize the pressure inside the bellows 162 with the pressure within the housing 84. With this construction of the bellows 162, upon a sudden change in the pressure within chamber 84, the bellows 162, as well as the bellows 88, expands or contracts to move the intermediate contact 96. Thereafter, the pressure inside and outside the bellows 162 begins to equalize through the restricted opening 166 thereby tending to effect a return movement of the contact 96. In this way, the bellows rod 164 is movable substantially in response to the rate of change of turbine temperature while the bellows rod 92 is responsive to the magnitude of the turbine temperature. Accordingly, the intermediate contact 96 is positioned both in response to the turbine temperature and to the rate of change of turbine temperature. The addition of the rate of change factor tends to prevent overshooting of the temperature control.

Small sealing diaphragms 168 and 170 are disposed between the bellows rods 92 and 164 and the housing 84. In order to balance out the atmospheric pressure acting on the sealing diaphragms 168 and 170, the bellows rods 92 and 164 are connected to a second set of small diaphragms 172 and 174 on the other side of the housing 84 as illustrated.

It is also desirable that the power control provide means for controlling the propeller blade angle so as to provide the aircraft with reverse thrust—for example, to brake the forward aircraft speed. To this end, when the control arm 144 has been moved to the right to its minimum power position, a contact 176 on the link 174 abuts against a fixed contact 178. Further movement of the control arm 144 to the right now causes the link 146 to swing about its pivot 148 thereby moving the rod 142 to the left. Also, as the propeller blade angle approaches a small positive angle— say 10°—the switch contacts 124 and 126 separate to prevent further blade angle decreasing operation of the motor 104. For this latter purpose, a cam 180 operatively connected to the motor 104, as schematically indicated by the dashed line 179 in Figure 1, is designed to open the contacts 124 and 126 at said 10° blade angle. Obviously, the cam 180 may be rotatable with the shank of one of the propeller blades.

Separation of contacts 124 and 126 opens the circuit to the pitch decreasing winding 114 of the motor so that further movement of the control arm 144 to the right is ineffective to cause any further decrease in the propeller blade angle. Then, when the control arm 144 is moved sufficiently far to the right to engage switch contacts 176 and 178, a circuit is completed to a solenoid winding 182 having a plunger 184. Hereinafter described switch contacts 186 and 188 in the solenoid circuit are assumed to be closed at this time. The solenoid plunger 184 is normally held in the position illustrated by a spring 190 but, when the solenoid winding 182 is energized, the plunger 184 moves to the right against the spring 190 to shift contacts 110 and 132 out from engagement with contacts 108 and 130 and into engagement with contacts 192 and 194. This operation reverses the connections of contacts 98 and 100 to the motor windings 102 and 114 so that switch contact 98 is now connected to the pitch decreasing winding 114 and switch contact 100 is now connected to the pitch increasing winding 102.

Upon further movement of the control arm 144 to the right, the link 146 rotates about the pivot 148 to move the rod 142 to the left thereby engaging contacts 96 and 98 and, because of the previous operation of the reversing solenoid 184, a circuit is thereby completed to the pitch decreasing winding 114 of the motor 104. This movement of the rod 142 to the left increases the turbine temperature setting and the motor 104 now operates in a pitch decreasing direction. Accordingly, the motor 104 will operate to reverse the angle of the propeller blades to their negative or reverse thrust range and this operation will continue until the propeller absorbs the power corresponding to the turbine temperature setting of the rod 142 just as in the case of forward thrust operation. The cam 180 is designed so that, when the propeller blades have been rotated to a small negative blade angle—say 10°—the switch contacts 124 and 126 are again closed. With this arrangement, the operation of the control system in the reverse thrust range is just the same as in the forward thrust range. With this arrangement, while the control arm 144 is in its forward thrust range and is being moved to the right toward its minimum thrust position, the cam 180 prevents the propeller blades from swinging through their zero blade angle to their negative blade angle range and becoming unstable in said negative blade angle range.

The control arm 144 is in its minimum power position for forward aircraft thrust when it is positioned so that the contacts 176 and 178 are about to engage. Movement of the control arm 144 to the left or to the right from this position moves the rod 142 to the left thereby increasing the turbine temperature setting and therefore increasing its power output. Movement of the control arm 144 to the left, from said minimum power position, increases the turbine power by effecting blade angle increasing adjustment of the angle of the propeller blades in their positive or forward thrust range, while a movement of the control arm 144 to the right from said minimum power position also increases the turbine power but the angle of the propeller blades is now adjusted in their negative or reverse thrust range.

With the aforedescribed structure, if the pilot should quickly pull the control arm 144 to the right for reverse thrust operation, the contacts 176 and 178 may engage to energize the solenoid 182 before the cam 180 opens switch contacts 124 and 126. At the same time, this movement of the control arm 144 to its reverse thrust range causes pivotal movement of the link 146 to increase the turbine temperature setting above its minimum value whereby switch contacts 96 and 100 may engage. At this time, if the contacts 124 and 126 are still engaged, a circuit is completed through said closed contacts 124 and 126 and reversing switch contacts 110 and 192 to the pitch increasing winding 102. As a result, the blade angle of the propeller would be adjusted in its positive blade angle range for increasing turbine power and this is just the opposite of the control desired by the pilot. This undesired control operation results from energization of the reversing solenoid 182 while contacts 124 and 126 are still closed. To prevent this undesired control operation, the circuit of the solenoid 182 is normally maintained open at previously mentioned contacts 186 and 188. The contacts 186 and 188 are controlled by a cam 196 which is designed to close contacts 186 and 188 at the same time that the cam 180 opens contacts 124 and 126. The arrangement is such that closure of switch contacts 176 and 178 by movement of the control arm 144 to the right does not complete a circuit for the reversing solenoid 182 unless contacts 186 and 188 have been closed and, therefore, unless contacts 124 and 126 have been opened.

Preferably, the cam 196 is also connected to the motor 104 by the connection 179 and is designed to close switch contacts 186 and 188 at the same time the cam 180 opens switch contacts 124 and 126, and in addition, after the contacts 186 and 188 have been closed by the cam 196, these contacts remain closed as the blade angle is decreased and also remain closed throughout the negative blade angle range.

At this point, it should be noted that the particular blade angle or angles at which the cams 180 and 196 are effective to close or open their switch contacts depends on the particular installation and on the operating characteristics desired.

Referring now to Figure 2, this figure graphically illustrates the relation between the turbine power required to drive the propeller and the blade angle of the propeller for different aircraft air speeds and at a particular rotative speed of the turbine. As illustrated, and particularly at high aircraft air speeds, there is a blade angle range in which the turbine power output to the propeller is negative—that is, the propeller helps the turbine drive the compressor 14. Assuming an aircraft air speed of 540 M. P. H., if the control arm 144 is progressively moved to the right to decrease the turbine temperature setting and to engage contacts 96 and 100, the pitch decreasing winding 114 is energized to progressively decrease the blade angle of the propeller until a positive blade angle of approximately 33° is reached. As illustrated in Figure 2, at this blade angle and at an aircraft air speed of 540 M. P. H., the turbine power is a minimum. If the temperature control arm 144 is now moved further to the right to further decrease the turbine temperature setting, the resulting energization of the pitch decreasing winding 114 further decreases the blade angle of the propeller, but a blade angle decrease now results in an increase in turbine power. Accordingly, the blade angle decreasing winding 114 remains energized so that the motor 104 operates to decrease the blade angle to the aforementioned positive blade angle of 10° at which the cam 180 opens the contacts 124 and 126 in the circuit of the winding 114, thereby stopping the motor 104. Thus, at high aircraft air speeds, there is a fairly large angle in which there is no control of the propeller blade angle— for example, at an aircraft air speed of 540 M. P. H., this angle of no control is equal to approximately 23° (33°–10°).

This angle of no control is equal to the difference in the blade angle for minimum turbine power and the blade angle at which the contacts 124 and 126 are opened by the cam 180 and obviously becomes smaller at lower aircraft air speeds. At high aircraft air speeds, it is quite unlikely that the turbine control arm 144 would be moved to its minimum value since this would impose considerable drag on the aircraft so that, in general, the angle of no control would be considerably smaller than said 23°. However, the magnitude of the angle in which there is no control of the propeller blade angle may be reduced for any particular aircraft air speed by the addition of the previously mentioned torque responsive switch contacts 118 and 120 in series with the contacts 124 and 126.

The torque responsive contact 118 is connected to a diaphragm 198 which is urged in a switch opening direction by a spring 200 and is urged in the opposite direction by the output pressure of a pump 202. The output pressure of the pump 202 also acts against the piston 204 which is urged against the pump pressure with a force proportional to the turbine torque driving the propeller. A pressure bleed opening 206 is controlled by the piston 204 so that any increase in the turbine torque results in movement of the piston 204 to the left to decrease the size of the bleed opening 206 until the output pressure of the pump 202 increases a corresponding amount. A torque meter of this type is more fully described in Patent No. 2,233,498 to E. S. Taylor. The piston 204 is also urged against the pressure of the pump 202 by a spring 208. With this arrangement, the output pressure of the pump 202 is equal to the sum of the turbine torque proportional force acting on the piston 204 and the force of the spring 208. The design is such that, at a predetermined negative propeller driving torque, the output pressure of the pump 202 is sufficiently low that the spring 200 is capable of opening the switch contacts 118 and 120. On Figure 2, this predetermined negative torque may correspond to a negative turbine power indicated by the line 210 which is equal to the minimum turbine power at an aircraft air speed of 360 M.P.H.

With this torque control of the contacts 118 and 120 and assuming an initial high aircraft speed, as the turbine temperature setting and, therefore, turbine power is reduced, the control operates in the aforedescribed manner until the turbine torque drops to that corresponding to the power line 210 in Figure 2—e. g. at an aircraft air speed of 540 M. P. H. At this torque, the switch contacts 118 and 120 separate to prevent further energization of the pitch decreasing winding 114 until the turbine torque output increases. As illustrated in Figure 2, as the aircraft slows down the turbine power and, therefore, turbine torque output, increases at a particular propeller blade angle and turbine speed. Accordingly, as the aircraft slows down, the torque responsive contacts 118 and 120 are periodically re-engaged to further decrease the blade angle of the propeller thereby maintaining the turbine torque output at the value corresponding to the turbine power line 210 in Figure 2. When the aircraft air speed drops to 360 M. P. H., any further decrease in blade angle of the propeller now results in an increase in turbine power and torque so that the torque responsive contacts 118 and 120 remain closed and the pitch decreasing winding 114 remains energized until the blade angle decreases to the angle at which the cam 180 opens contacts 124 and 126. The angle of no control for high aircraft air speeds is now reduced to the region between the angle (18°) for minimum turbine power at an aircraft air speed of 360 M. P. H. and the angle (10°) at which the cam 180 opens the contacts 124 and 126. By increasing, in a positive direction, the torque at which the switch contacts 118 and 120 open, the region of no control of the propeller blade angle could be made even smaller.

With the aforedescribed structure, when the pilot wants more power, he moves the control arm 144 to the left to increase the turbine temperature setting. Thereupon, the temperature control operates to effect an increase in the blade angle of the propeller with the result that the turbine tends to slow down so that the governor increases the turbine fuel supply to maintain the turbine speed and increase the turbine temperature to the desired value. That is, when the operator demands more power, the propeller blade angle is increased before there is any increase in the turbine fuel supply. This arrangement may involve too much time delay when more power is needed quickly. Accordingly, a conventional fuel accelerator pump or equivalent structure may be added to provide an immediate temporary increase in the turbine fuel supply when the control arm 144 is moved quickly because of a sudden need for more power. For this purpose, as illustrated, a second by-pass valve 212 is connected around the positive displacement fuel pump 78. This by-pass valve 212 is connected to a piston 214 slidable in the cylinder 216 and urged to a central position by springs 218. Also slidable in the cylinder 216 is a second piston 220 having a restricted opening 222 therethrough and being connected to the temperature setting rod 142 for movement therewith.

The cylinder 216, on opposite sides of the piston 220, is filled with a suitable gas sealed therein. With this arrangement, when the temperature setting rod 142 is moved slowly, the piston 220 moves slowly so that the gas within the cylinder 216 flows through the restriction 222 without causing any appreciable change in the pressure acting on the valve controlling piston 214. However, if, for example, the rod 142 is moved quickly to the left for increasing the turbine power setting then the resulting sudden leftward movement of the piston 220 causes a temporary decrease in pressure acting on the left side of the piston 214 whereupon the piston 214 temporarily moves to the left to effect a closing adjustment of the by-pass valve 212 thereby producing an immediate increase in the turbine fuel supply. This adjustment of the by-pass valve 212 is only temporary because the flow of gas through the restricted opening 222 slowly equalizes the pressure on opposite sides of the piston 220 whereupon the valve 212 returns to its normal position, by which time the governor has operated the valve 74 to provide the necessary increase in fuel supply. A similar but reverse operation takes place when the temperature setting rod 142 is suddenly moved to the right to decrease the turbine power setting. Thus, quick movement of the rod 142 to the right temporarily increases the pressure acting on the left side of the piston 214 whereupon the piston 214 moves to the right to effect a temporary opening adjustment of the by-pass valve 212 to temporarily decrease the turbine fuel supply.

As best seen in Figures 3 and 4, the turbine combustion chamber 24 is annular and the turbine temperature responsive element within the chamber 24 may comprise a gas-filled tube 82 coiled in front of the combustion chamber nozzle 32. The tube 82 communicates with the interior of the housing 84 through a passage 86 as previously described. Preferably, the tube 82 is also provided with external fins 226 to increase its heat exchange surface. With the gas tube 82 disposed as illustrated, it comprises a heat shield protecting the annular nozzle 32 from excessive heat radiating, particularly from the combustion flame within the chamber 24.

As used in the appendant claims, unless otherwise specified, increasing or decreasing the propeller blade angle refers to increasing or decreasing this angle in its range for forward aircraft thrust.

While I have described my invention in detail in its present preferred embodiment, it will be obvious to those skilled in the art, after understanding my invention, that various changes and modifications may be made therein without departing from the spirit or scope thereof. I aim

I claim as my invention:

1. A control system for a gas turbine drivably connected to an adjustable pitch propeller, said system comprising means responsive to an increase or decrease in turbine speed for respectively decreasing or increasing the rate at which fuel is supplied to said turbine to maintain said speed at a predetermined value, means responsive to changes in turbine temperature, blade angle varying means controlled by said temperature responsive means for increasing the blade angle of said propeller only when the turbine temperature falls below a predetermined temperature range and for decreasing said blade angle only when the turbine temperature rises above said temperature range, and means operable to shift said temperature range.

2. A control system for a gas turbine drivably connected to an adjustable pitch propeller, said system comprising means responsive to changes in turbine speed for varying the rate at which fuel is supplied to said turbine, means responsive to an increase or decrease in turbine temperature for respectively decreasing or increasing the propeller blade angle, means movable to vary the turbine temperature at which said temperature responsive means is effective to change the propeller blade angle, and means responsive to quick operation of said movable means in a turbine temperature increasing direction to provide a temporary increase in the rate of turbine fuel supply independently of said speed responsive means.

3. A control system for a gas turbine drivably connected to an adjustable pitch propeller, said system comprising means responsive to changes in turbine speed for varying the rate at which fuel is supplied to said turbine, means responsive to an increase or decrease in turbine temperature for respectively decreasing or increasing the propeller blade angle, means movable to vary the turbine temperature at which said temperature responsive means is effective to change the propeller blade angle, and means responsive to quick operation of said movable means for providing, independently of said speed responsive means, a temporary increase or decrease in the turbine fuel supply depending on whether said movable means is moved in a temperature increasing or decreasing direction.

4. A control system for a gas turbine drivably connected to an adjustable pitch propeller, said system comprising means responsive to changes in turbine speed for varying the rate at which fuel is supplied to said turbine, means responsive to magnitude of turbine temperature, means responsive to rate of change of turbine temperature, and means controlled by both said temperature responsive means for varying the blade angle of the propeller.

5. A control system for a gas turbine drivably connected to an adjustable pitch propeller, said system comprising means responsive to changes in turbine speed for varying the rate at which fuel is supplied to said turbine, means responsive to changes in turbine temperature for varying the blade angle of said propeller, means responsive to the torque output of said turbine, and means controlled by said torque responsive means for preventing a decrease of said blade angle when said torque output is less than a predetermined value.

6. A control system for a gas turbine drivably connected to an adjustable pitch propeller, said system comprising a positive displacement pump drivably connected to said turbine for supplying fuel to said turbine, means responsive to changes in turbine speed, fuel regulating means controlled by said responsive means for varying the quantity of fuel supplied to said turbine by said pump per turbine revolution so as to maintain a predetermined turbine speed, and means responsive to changes in turbine temperature, blade angle varying means controlled by said temperature responsive means for increasing the blade angle of said propeller when said temperature falls below a predetermined value.

7. A control system for a gas turbine drivably connected to an adjustable pitch propeller, said system comprising means responsive to changes in turbine speed for varying the rate at which fuel is supplied to said turbine, motor means for varying the blade angle of said propeller, first means normally operable for effecting movement of said motor means for decreasing said blade angle, second means normally operable for effecting movement of said motor means for increasing said blade angle, means responsive to turbine temperature for controlling the operation of said first and second operable means, movable means connected to said propeller for movement with blade angle changing movement of its blades, and means controlled by said movable means adapted to render said first normally operable means ineffective when said blade angle is less than a predetermined value.

8. A control system for a gas turbine including a combustion chamber and a discharge nozzle for said chamber, said system comprising means responsive to changes in combustion chamber temperature for regulating the power output of said turbine, said means comprising a gas-filled tube coiled in front of said nozzle to shield said nozzle from heat radiating from the combustion flame within said chamber.

9. A control system for a gas turbine drivably connected to an adjustable pitch propeller; said system comprising means responsive to changes in turbine temperature; blade angle varying means controlled by said responsive means for increasing the blade angle of said propeller upon a decrease in turbine temperature below a predetermined value; and means operable for varying said predetermined value of temperature.

10. A control system for a gas turbine drivably connected to an adjustable pitch propeller; said system comprising means responsive to changes in turbine temperature; motor means controlled by said responsive means for decreasing the blade angle of said propeller when the turbine temperature rises above a predetermined temperature range and for decreasing said blade angle when said temperature falls below said range, said temperature responsive means being ineffective to vary said blade angle when said temperature is within said range; and means operable for shifting said temperature range.

11. A control system for a gas turbine drivably connected to an adjustable pitch propeller; said system comprising means responsive to changes in turbine speed fuel regulating means controlled by said responsive means for progressively increasing the rate at which fuel for combustion is supplied to said turbine while said speed is below a predetermined value and for progressively decreasing the rate at which fuel for combustion is supplied to said turbine while said speed is above a predetermined value; means responsive to turbine temperature; and blade angle varying means controlled by said temperature responsive means for increasing the blade angle of said propeller when said temperature decreases below a predetermined value.

12. A control system for a gas turbine drivably connected to an adjustable pitch propeller; said system comprising means for regulating the blade angle of said propeller; means for regulating the rate at which fuel for combustion is supplied to said turbine; means responsive to changes in turbine speed means controlled by said responsive means for controlling the operation of said fuel regulating means but not said blade angle regulating means so as to progressively increase the rate at which fuel for combustion is supplied to said turbine while said speed is below a predetermined value and to progressively decrease the rate at which fuel for combustion is supplied to said turbine while said speed is above a predetermined value; means responsive to turbine temperature; means controlled by said temperature responsive means for effecting operation of said blade angle regulating means for increasing the propeller blade angle when said temperature decreases below a predetermined value; and means operable for varying said predetermined value of temperature.

13. A control system for a gas turbine drivably connected to an adjustable pitch propeller; said system comprising means for regulating the blade angle of said propeller; means for regulating the rate at which fuel for combustion is supplied to said turbine; means responsive to changes in turbine speed for controlling the operation of said fuel regulating means but not said blade angle regulating means so as to increase or decrease the rate of fuel supply respectively with decrease or increase in said speed; means responsive to changes in turbine temperature; motor means controlled by said responsive means for effecting operation of said blade angle regulating means for increasing or decreasing said blade angle when said temperature respectively goes below or above a predetermined temperature range, said temperature responsive means being ineffective to vary said blade angle when said temperature is within said range.

14. A control system as recited in claim 13 and including means operable for shifting said temperature range.

15. A control system for a gas turbine drivably connected to an adjustable pitch propeller; said system comprising means responsive to changes in turbine speed for varying the rate at which fuel is supplied to said turbine; motor means for varying the blade angle of said propeller; means responsive to changes in turbine temperature for controlling said motor means so that an increase in said temperature normally effects a decrease in said blade angle and a decrease in said temperature normally effects an increase in said blade angle; means movable to vary the temperature maintained by said temperature responsive means; and means controlled by said movable means for automatically reversing said blade angle control when said movable means is set for a temperature below a predetermined value.

16. In combination with a gas turbine drivably connected to an adjustable pitch propeller; a control system comprising means responsive to changes in turbine speed for varying the rate at which fuel is supplied to said turbine; motor means for varying the blade angle of said propeller; means responsive to changes in turbine temperature for controlling said motor means so that an increase in said temperature normally effects a decrease in said blade angle and a decrease in said temperature normally effects an increase in said blade angle; means movable to vary the temperature maintained by said temperature responsive means; means controlled by said movable means for automatically reversing said blade angle control when said movable means is set for a temperature below a predetermined value; and means automatically operative when the propeller blade angle is less than a predetermined value for rendering said reversing means ineffective.

17. A control system for a gas turbine power plant having means operable for varying its power output; said system comprising means responsive to the magnitude of turbine temperature; means responsive to the rate of change of said temperature; motor means for operating said power varying means; and means controlled by both said responsive means for controlling the operation of said motor means.

18. A control system for a gas turbine power plant for a vehicle in which said power plant has means for varying its thrust output in addition to means for varying its fuel supply; said system comprising means responsive to changes in turbine temperatures; motor means controlled by said responsive means for effecting thrust decreasing operation of said thrust varying means when the turbine temperature rises above a predetermined temperature range and for effecting thrust increasing operation of said thrust varying means when said temperature falls below said range, said temperature responsive means being ineffective within said range; and means operable for shifting said range.

19. A control system for a gas turbine power plant for a vehicle in which said power plant has means for varying the rate of fuel supply and means for varying its thrust output; said system comprising means responsive to turbine speed; means controlled by said speed responsive means and operatively connected to said fuel varying means for maintaining said speed at a predetermined value by effecting operation of said fuel varying means so as to decrease or increase the rate at which fuel is supplied to said turbine respectively with increase or decrease in turbine speed; means responsive to changes in turbine temperature; and means controlled by said temperature responsive means and operatively connected to said thrust varying means for effecting operation of said thrust varying means for decreasing said thrust when the turbine temperature increases above a predetermined value.

20. A control system for a gas turbine power plant for a vehicle in which said power plant has means for varying the rate of fuel supply and means for varying its thrust output; said system comprising means responsive to turbine speed; means controlled by said speed responsive means and operatively connected to said fuel varying means for maintaining said speed at a predetermined value by effecting operation of said fuel varying means so as to decrease or increase the rate at which fuel is supplied to said turbine respectively with increase or decrease in turbine speed; means responsive to changes in turbine temperature; means controlled by said temperature responsive means and operatively connected to said thrust varying means for effecting thrust decreasing operation of said thrust varying means when the turbine temperature rises above a predetermined temperature range and for effecting thrust increasing operation of said thrust varying means when said temperature falls below said range, said temperature responsive means being ineffective within said range; and means operable for shifting said temperature range.

VINCENT MOORE.

REFERENCES CITED

The following references are of record in the file of this patent:

UNITED STATES PATENTS

| Number | Name | Date |
|---|---|---|
| 1,314,175 | Wells et al. | Aug. 26, 1919 |
| 2,219,994 | Jung | Oct. 29, 1940 |
| 2,231,292 | Neugebauer | Feb. 11, 1941 |
| 2,280,835 | Lysholm | Apr. 28, 1942 |
| 2,292,288 | Pescara | Aug. 4, 1942 |
| 2,306,953 | Jung | Dec. 29, 1942 |
| 2,404,428 | Bradbury | July 23, 1946 |
| 2,457,595 | Orr | Dec. 28, 1948 |

FOREIGN PATENTS

| Number | Country | Date |
|---|---|---|
| 578,120 | Great Britain | June 17, 1946 |

OTHER REFERENCES

"Flight," publication, February 17, 1944.